United States Patent [19]

Audeh et al.

[11] 4,347,225

[45] * Aug. 31, 1982

[54] METHOD FOR TREATING ALKALINE EFFLUENTS RESULTING FROM PETROLEUM PROCESSING

[75] Inventors: Costandi A. Audeh, Princeton; Saverio G. Greco, Princeton Junction, both of N.J.

[73] Assignee: Mobil Oil Corporation, New York, N.Y.

[*] Notice: The portion of the term of this patent subsequent to Aug. 31, 1999, has been disclaimed.

[21] Appl. No.: 238,309

[22] Filed: Feb. 26, 1981

[51] Int. Cl.³ .............................................. C01D 5/00
[52] U.S. Cl. .................... 423/207; 423/210; 423/224; 423/542; 423/551; 208/209; 208/234; 208/235; 210/737; 210/751; 210/761; 110/238; 110/346
[58] Field of Search ............... 423/210, 224, 179, 182, 423/183, 200, 206, 207, 522, 541, 542, 551; 208/132, 209, 230, 234, 235; 210/737, 751, 761; 110/238, 346

[56] References Cited

U.S. PATENT DOCUMENTS

| | | | |
|---|---|---|---|
| 1,807,528 | 5/1931 | Hiatt | 423/224 |
| 1,929,675 | 10/1933 | Chappell et al. | 423/210 C |
| 4,073,871 | 2/1978 | Optiz et al. | 423/210 C |
| 4,154,607 | 5/1979 | Wikman et al. | 423/179 X |
| 4,237,103 | 12/1980 | Prible | 423/207 |
| 4,270,468 | 6/1981 | Robinson et al. | 110/346 X |

FOREIGN PATENT DOCUMENTS 281273 12/1970 U.S.S.R. .............................. 423/551

OTHER PUBLICATIONS

Sales/Trade Brochure "John Zink Process Systems", 1980.

Primary Examiner—Earl C. Thomas
Attorney, Agent, or Firm—Charles A. Huggett; Michael G. Gilman; Charles J. Speciale

[57] ABSTRACT

The present invention is a method for treating alkaline effluents resulting from petroleum processing by incinerating the effluents in the presence of oxygen and a sufficient amount of hydrogen sulfide fuel to convert the alkaline material to the corresponding sulfate.

9 Claims, 1 Drawing Figure

METHOD FOR TREATING ALKALINE EFFLUENTS RESULTING FROM PETROLEUM PROCESSING

BACKGROUND OF THE INVENTION

The present invention relates to the art of petroleum processing and, in particular, to the disposal of harmful and noxious waste products resulting therefrom.

Crude oils are exceedingly complex mixtures, consisting predominantly of hydrocarbons containing sulfur, nitrogen, oxygen, and metals as minor constituents. While it is desirable to recover the hydrocarbon constituents in their pure form, realistically it is very difficult to isolate pure products because most of the minor constituents occur in combination with carbon and hydrogen. Separation of impurities such as those listed above generally requires expenditures of valuable resources such as time, chemicals, energy, and money. Therefore, it is the constant goal of the petroleum processing industry to optimize impurity-removal procedures, equipment, and resources in order to eliminate those impurities which have the most degrading effect on the end products.

Perhaps the most ubiquitous impurity encountered in petroleum processing is sulfur. The presence of sulfur in petroleum products and, indeed, in the crude feedstock itself generally increases the corrosive characteristics thereof, and forms harmful and noxious reaction products upon combustion. In particular, the presence of sulfur-containing compounds reduces the combustion characteristics of gasoline and may render fuel oil unusuable in many places due to local regulation on the amount of sulfur allowed therein. Consequently, at nearly every stage of production measures are taken to either reduce the amount of sulfur or to render the sulfurcontaining compounds inoffensive.

One method for removing sulfur-containing compounds—hydrogen treating of petroleum fractions—has been known since the 1930's. However, it was not until the advent of catalytic reforming, which made inexpensive hydrogen-rich off-gas available, that hydrogen desulfurization developed to commercial level. Presently, hydrogen desulfurization is primarily associated with a catalytic reaction using colbalt molybdate on an alumina carrier. The feedstock is mixed with recycle and make-up hydrogen and heated to 400°–850° F., then charged to a fixed bed reactor at 50–1,500 psig.

Hydrogen treating is now used extensively to prepare reformer feedstock and, to some extent, for catalytic cracking feedstock preparation. It may also be used to upgrade middle distillates, cracked fractions, lube oils, gasolines, and waxes. Hydrodesulfurization, however, is a high energyconsuming process which also requires a supply of hydrogen.

Moreover, a major effluent resulting from hydrodesulfurization is hydrogen sulfide, $H_2S$,—a flammable poisonous gas. Even though hydrogen sulfide may simply be burned-off into the atmosphere legislation in recent years has effectively limited this method of disposal because of the formation of sulfur dioxide which is intensely irritating to the eyes and respiratory system. Accordingly, alternative means for disposing of hydrogen sulfide have been developed and implemented.

The primary method of disposing of hydrogen sulfide is to convert the sulfur-bearing gas to elemental sulfur and water by, for instance, the Claus process. While this alternative may appear somewhat attractive since elemental sulfur is a saleable commodity, the Claus process requires construction of sulfur plants, quantities of catalysts, and energy. Furthermore, the market for elemental sulfur is not so extensive as to be able to absorb all the elemental sulfur currently produced without depressing the price therefor. Finally, the Claus process itself is fraught with some difficulty in that approximately 3% of the reaction product is, again, the noxious dioxide which must be further treated by, for instance, a tail gas treating process, in order to reduce the level of $SO_2$ effluent to within the Environmental Protection Agency standard of not more than 250 parts per million on a dry oxygen-free basis. Consequently, while the Claus process is still a viable alternative for disposing of hydrogen sulfide gas, it has become less attractive because of the cost of carrying out the process and because of the decrease in demand for the elemental sulfur.

Another method for treating petroleum to reduce the degrading effects of sulfur is chemical processing to "sweeten" sulfur compounds contained in the particular fractions, e.g., the mercaptans which are designated by the formula RSH. "Sweetening" denotes that mercaptan sulfur compounds are removed from a refinery stream, or else the mercaptans are converted to less objectionable disulfide compounds, e.g., R-S-S-R, R-S-S-R', etc. A particularly important process employed today is the sweetening of kerosine by the MEROX process to obtain jet fuel.

Whether sweetening is undertaken by solvent refining processes or by fixed bed adsorption, a caustic solution is generally first used to convert the mercaptan to the ionic state, $RS^-$. Caustic solution is also helpful in that it removes napththenic acids and other organic acids in general, and other sulfur compounds from cracked petroleum products and petroleum distillate. In fact, caustic treating of petroleum products has been used to improve odor and color nearly as long as the industry itself has been in existence. Numerous equipment modifications and processes have been designed to implement caustic treatment of process streams. Unfortunately, since caustic is quite harmful to organic tissue extreme care must be taken in the use and disposal of alkaline solutions such as sodium hydroxide solutions in order to protect the waterways, rivers, subterranean water formations, and, in many places, the oceans and surrounding seas of industrial areas from caustic pollution. This presents a significant problem to the industry because of the great volume of caustic used in petroleum processing and because all of the solutions used must eventually be discarded as a nonregenerative caustic or as the spent liquor resulting from a regenerative process.

To date, the industry generally uses two methods to dispose of spent caustic—neutralization and incineration, incineration being a relatively new trend in waste alkaline liquor disposal. Incineration disposal presents certain advantages over neutralization disposal in that it is, first of all, environmentally cleaner since acid neutralization has a residual OOD (Organic Oxygen Demand) for the naphthenic acids. Other advantages include such benefits as lower capital investment and less operating space required (i.e. ground area). Furthermore, incineration disposal is easier to operate. On the negative side, cost of operation of the incinerator units is high because of the energy required to maintain the elevated temperatures necessary to maintain combustion of the predominantly aqueous solution of alkaline waste. Commercial units presently in operation make use of the combustion of fuel oil, and natural gas to sustain the evaporation of the aqueous parts of the waste liquor and then furnish mostly carbon dioxide, $CO_2$, to form the innocuous carbonates of sodium or other alkali metals for disposal. Refined fuel oil, and natural gas are very expensive means for disposing of the volumes of caustic discarded as a result of petroleum processing and they are both very valuable commodities in terms of consumer-useable energy sources.

From the foregoing discussion, it can be seen that the elimination of sulfur from petroleum presents several problems including, inter alia, production of alkaline waste liquor and hydrogen sulfide, both of which require either energy and/or expensive treatment to convert them to environmentally safe substances. It is, therefore, a primary purpose of the present invention to provide a process whereby the great volume of alkaline waste liquor which results from petroleum processing can be safely disposed of without expending commercially useable and expensive fuel supplies.

Another object of this invention is to provide a process for the formation of innocuous products from potentially harmful and/or noxious sulfur-containing fuels.

SUMMARY OF THE INVENTION

By the present invention, it is proposed to provide a method for treating alkaline effluents generated during petroleum processing consisting essentially of incinerating those effluents in the presence of oxygen and a sufficient quantity of sulfur-containing fuel to convert the alkaline material, which is normally spent caustic to the corresponding sulfate. In a preferred embodiment of the present invention the sulfur-containing fuel is hydrogen sulfide, $H_2S$, which may be derived from any hydrogen-sulfide-producing process such as hydrodesulfurization. The combustion temperature at which the alkaline effluent is incinerated is preferably about 1250° C.

The combustion of hydrogen sulfide provides the heat necessary to initiate combustion of organic compounds in the waste, and it provides oxides of sulfur to neutralize the caustic by formation of innocuous compounds, e.g., $Na_2SO_4$, $K_2SO_4$, etc.

For a better understanding of the present invention, together with other and further objects, reference is made to the following description taken in conjunction with the accompanying drawings, and its scope will be pointed out in the appended claims.

DETAILED DESCRIPTION OF THE INVENTION

Figure 1:
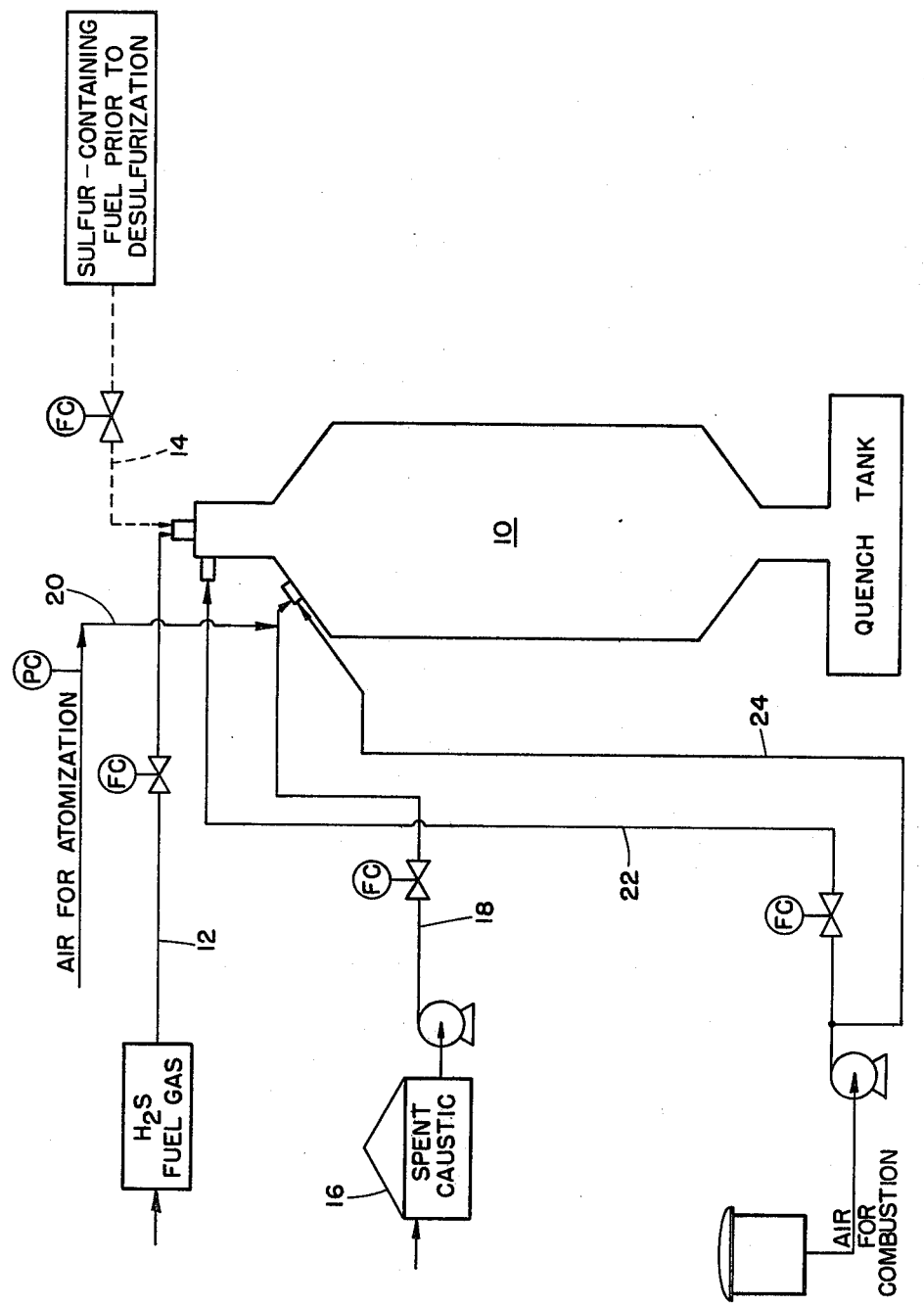
FIG. 1 is a schematic of the process of the present invention.

The process of the present invention is based on the principle that an alkaline compound is capable of reacting with a sulfur-containing fuel in the presence of oxygen to form a harmless sulfate. Stoichiometrically, the typical reaction proceeds according to the following equations:

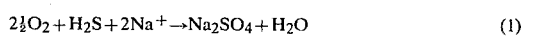

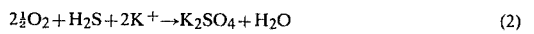

Referring to the drawing, the above-described conversion reaction takes place in a refractory incinerating column 10, into which the different components are fed by means of metered flow stream lines as described herein.

In a preferred embodiment of the invention, the fuel used to support the combustion reaction is hydrogen sulfide gas, $H_2S$, which may be derived from hydrodesulfurization processes. Pure $H_2S$ is not required but rather various $H_2S$-containing refinery streams can be used. This form of the process is especially attractive since the combustion of gas is easier than the combustion of a liquid sulfur-containing fuel, such as fuel oil. In the drawing, fuel input is designated by feed line 12 which supplies the fuel to the top portion of the column. Additionally, a fuel supply line, shown as phantom feed line 14, may be installed to provide an alternate supply of sulfur-containing fuel to be used in addition to or in lieu of the previously-indicated source. If the alternate supply of sulfur-containing fuel is in a physical state different than the physical state of the primary source, e.g., liquid fuel oil vs. gaseous hydrogen sulfide, then a separate metering device should be used on the additional fuel supply line, as is depicted herein, in order to facilitate maintenance of the correct stoichiometric amount of sulfur to sustain the described reactions.

The other primary reaction product and the most important waste product that must be disposed of is the alkaline waste liquor. Preferably, this waste liquor is first collected in a repository 16 from the various sources in the petroleum processing system wherein spent caustic is generated. The alkaline solution, which is predominantly aqueous in nature, is then pumped to the incinerator unit over alkaline supply line 18 into which pressurized air is injected via air feed line 20 prior to introduction into the incineration chamber. Pressurized air is needed to atomize the aqueous alkaline solution so that the aqueous content and the alkaline material is finely dispersed to facilitate rapid reaction.

The final reaction component that must be provided for the conversion of waste caustic and hydrogen sulfide fuel to the innocuous sulfate is oxygen. Besides the oxygen which is provided to atomize the caustic or to atomize a liquid fuel if, for instance, fuel oil is used as an auxiliary fuel, oxygen should also be provided by, for example, a separate air supply line 22 in a sufficient quantity to insure total combustion of the alkaline material in the spent waste liquor, as well as any organic compounds that may be formed in the waste liquor. Additional air may be provided via subsidiary air supply line 24 to the input of the waste caustic solution to insure that the solution is adequately dispersed for complete burning.

Once the combined fuel, oxygen and caustic is ignited, continual combustion is sustained by the heat of the described reaction and normal rapid oxidation of the components found in the waste caustic/fuel mixture. Combustion of organic compounds present in the waste liquors aid in the heat balance of the incinerator, form $CO_2$ as a combustion product, and generate carbonate salts of the alkali metals.

Furthermore, every mole of hydrogen sulfide combusted supplies one mole of $H_2$ for the generation of $H_2O$, which is also needed in the maintenance of the mass and heat balances of the incinerator.

To be sure certain advantages accure to the process wherein the gaseous $H_2S$ is used as the fuel. Control of the fuel to air to waste liquor ratio of a gaseous fuel is easier than controlling that of a heavier viscuous fuel oil, especially if changes in the nature of the alkali metal ions content is anticipated. Furthermore, $H_2S$ contains 94% sulfur and thus furnishes a constant sulfur content for much operation.

However, it is still within the scope of the present invention to include the use of sulfur-containing fuel oil as an auxiliary fuel to support continual conversion reaction. This option becomes particularly attractive when the crude stock is exceptionally sour (i.e. high in sulfur content) thereby requiring extensive hydrodesulfurization to obtain a fuel oil which is saleable in those parts of the country that require the use of a relatively sulfur-free fuel oil for industrial and domestic heating. Hydrodesulfurization, however, is an energy intensive process that requires a constant supply of hydrogen. Instead of processing the fuel oil fraction to the extent required to eliminate nearly all the sulfur-containing compounds found therein, it may well be discovered upon cost analysis that a savings would be realized by burning the high-sulfur-content fuel oil in the process described by the present invention to render the caustic effluents harmless.

Regardless of the auxiliary fuel, the principle of the present invention reamins the provision of a hydrogen sulfide as a fuel to incinerate an alkaline solution thereby producing a harmless sulfate, and, while a particular arrangement of apparatus is schematically shown herein as a system for implementing this process, the inventors do not concede this to be in any way a limiting depiction of the myriad of arrangements which could be used to perform the novel process.

While there have been described what are believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A method for treating alkaline effluents resulting from petroleum processing comprising incinerating said effluents in the presence of oxygen and a sufficient amount of hydrogen sulfide to convert the alkaline material to the corresponding sulfate.

2. A method as in claim 1 wherein said effluent comprises spent sodium hydroxide treating solution.

3. A method as in claim 1 wherein said hydrogen sulfide comprises a component of a refinery stream off-gas.

4. A method for treating alkaline effluents resulting from petroleum processing comprising incinerating said effluents in the presence of oxygen and sufficient amount of hydrogen sulfide and an auxiliary sulfur-containing fuel to convert the alkaline material to the corresponding sulfate.

5. A method as in claim 4 wherein said auxiliary fuel comprises sulfur-containing fuel oil.

6. A method as in claim 5 wherein said fuel oil comprises a fuel oil fraction prior to extensive hydrodesulfurization.

7. A method as in claim 1 or claim 4 wherein said effluent comprises spent potassium hydroxide treating solution.

8. A method as in claim 1 or claim 4 wherein said incineration process comprises combusting said effluent at a temperature of from about 700° C. to about 1750° C.

9. A method as in claim 8 wherein said combustion temperature is about 1250° C.

* * * * *